Sept. 1, 1970
L. E. FROSLIE
3,526,291
VEHICLE TOP SPEED LIMITER
Filed Sept. 5, 1968
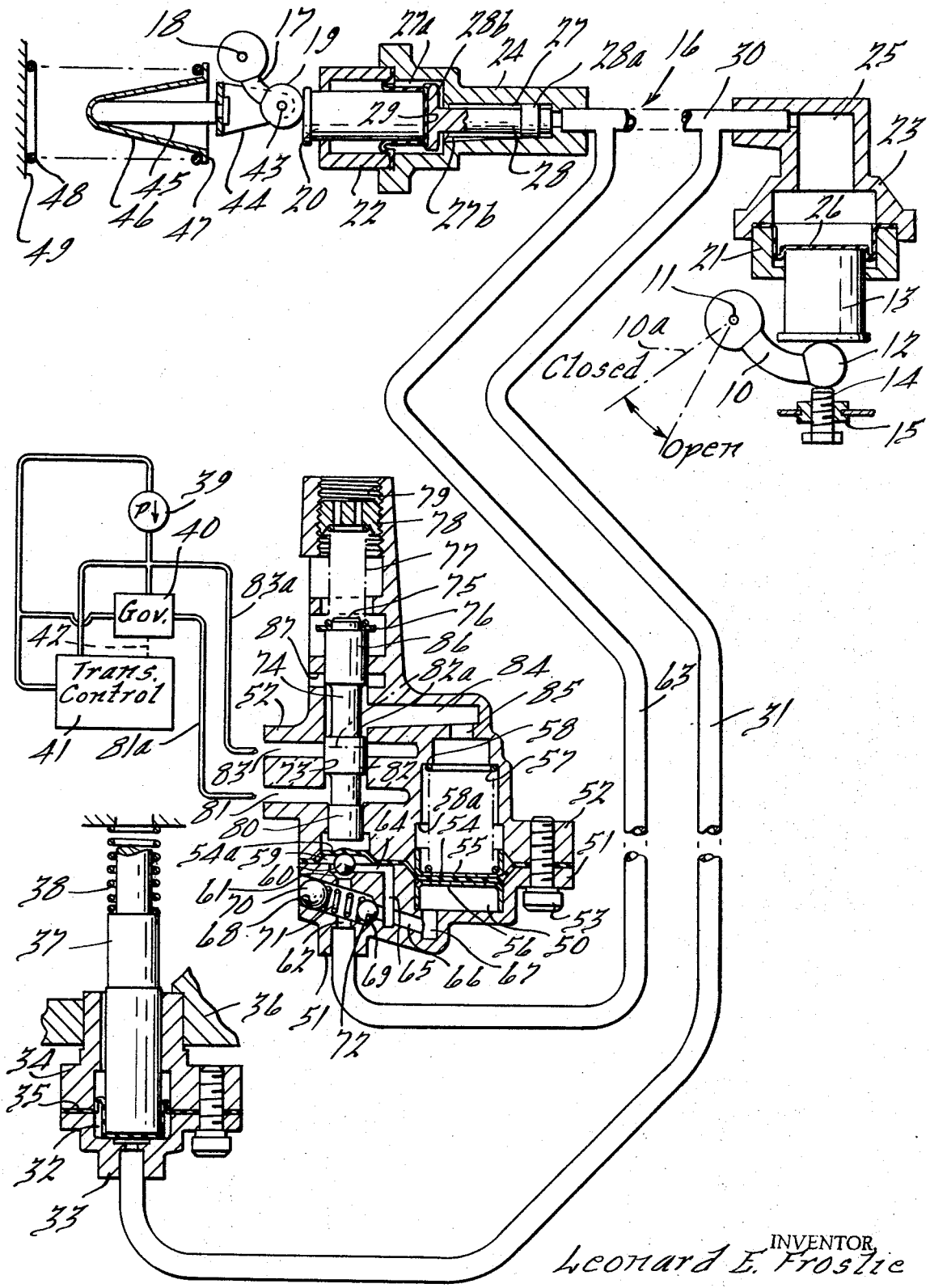
INVENTOR
Leonard E. Froslie
BY Harness, Talburtt, and Baldwin
ATTORNEYS.

United States Patent Office 3,526,291
Patented Sept. 1, 1970

3,526,291
VEHICLE TOP SPEED LIMITER
Leonard E. Froslie, Detroit, Mich., assignor to Chrysler Corporation, Highland Park, Mich., a corporation of Delaware
Filed Sept. 5, 1968, Ser. No. 757,654
Int. Cl. B60k *31/00*
U.S. Cl. 180—108                                9 Claims

ABSTRACT OF THE DISCLOSURE

A fluid coupling between the customary throttle pedal and throttle valve of an automotive vehicle and containing a fixed volume of incompressible fluid normally opens the throttle valve against the reaction of a throttle return spring in accordance with pedal movement. An accumulator connected with the coupling is expanded in response to a predetermined vehicle upper speed limit to bleed fluid from the coupling and thereby decrease the throttle opening.

BACKGROUND AND SUMMARY OF THE INVENTION

This invention relates to improvements in a vehicle top speed limiter and has for an important object the provision of such a device wherein a hydraulic coupling having a fixed volume of incompressible fluid connects the customary throttle pedal and throttle valve to open the latter in accordance with pedal movement, and wherein means responsive to vehicle speed, as distinguished from engine speed, bleeds a portion of the fluid from the coupling to reduce the throttle opening when the vehicle speed approaches the desired upper limit.

Another object is to provide such a device which is particularly adapted for use with an automobile having a conventional hydraulic actuated transmission, including a transmission pump for supplying actuating pressure, and also including a governor for supplying governor or transmission control pressure as a function of vehicle speed, whereby the pump and governor pressures are employed to modulate the throttle opening by bleeding fluid from the hydraulic coupling or returning fluid thereto in accordance with the vehicle speed.

Other objects of this invention will appear in the following description and appended claims, reference being had to the accompanying drawing forming a part of this specification wherein like reference characters designate corresponding parts in the several views.

The drawing is a diagrammatic sketch showing an embodiment of the invention employed with a hydraulic coupling or connection between the throttle pedal and throttle valve of an automobile having a fluid actuated transmission.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

DESCRIPTION OF A PREFERRED EMBODIMENT

Referring to the drawing, a pedal-operated lever 10 is operatively connected with the customary throttle pedal as indicated at 10a and is pivotally connected at 11 with a fixed portion of the automobile body so as to swing the ball end 12 of the lever 10 into engagement with the base of a plunger 13. An adjustable screw-threaded stop 14 is screwed into a fixed portion 15 of the vehicle body to limit clockwise throttle closing movement of the lever 10. A fluid-filled hydraulic coupling indicated generally by the numeral 16 operably connects the plunger 13 with a throttle operating lever 17, which is connected to a pivotal shaft 18 comprising the cross shaft of the customary butterfly type throttle in an automobile carburetor. The lever 17 has a ball end 19 seated against the base of a plunger 20. The plunger 13 and 20 are reciprocable axially in cylindrical guides 21 and 22 secured to housing elements 23 and 24 respectively fixed with respect to the vehicle body.

The housing 23 defines a fluid-filled cylindrical chamber 25 closed at one end by a flexible diaphragm 26 which overlies the plunger 13 and is secured around its periphery by being clamped between juxtaposed portion of the guide 21 and housing 23. The housing 24 defines a fluid-filled cylindrical chamber 27 contianing an axially reciprocable plunger 28 having a cylindrical guide land 28a at one end and a cup-shaped enlargement 28b at its opposite end contained within a coaxial enlargement 27a of the chamber 27. A bypass groove extends axially within the inner wall of chamber 27 to permit the free flow of fluid in either direction past the guide 28a. A flexible diaphragm 29 overlies the inner end of plunger 20 and is secured between the latter and cup 28b. The diaphragm 29 also closes chamber enlargement 27a by being clamped around its periphery between mating portions of the guide 22 and housing 24. A fluid-filled conduit 30 connects the chambers 25 and 27 to complete the aforesaid fluid coupling 16, whereby pivotal movement of lever 10 results in a corresponding pivotal movement of lever 17 to open or close the throttle.

The above structure is adapted for use with a hydraulic transmission for changing the speed ratio between the engine and the vehicle drive shaft, which may be conventional, and which is modulated in accordance with customary practice by the extent of throttle opening and by vehicle speed. The throttle modulation of the transmission is accomplished by means of a fluid-filled conduit 31 in communication with the conduit 30 and a fluid-filled chamber 32 defined by housing members 33 and 34 suitably clamped together with a flexible diaphragm 35 therebetween. The housing 34 is secured to a fixed portion 36 of the vehicle body and provides a guide for an axially shiftable plunger 37 secured at one end to diaphragm 35 and secured at its opposite end to the customary transmission modulating linkage to actuate the latter in accordance with throttle movement. Return spring 38 under compression between an annular shoulder of the plunger 37 and a fixed portion of the vehicle normally urges the plunger 37 downwardly in opposition to fluid pressure exerted against the diaphragm 35 as explained below.

Also comprising part of the transmission operating mechanism is a hydraulic pump 39 in an operative fluid circuit connected to a transmission control mechanism including a fluid pressure governor 40, which provides an output pressure as a function of vehicle speed, and a transmission control mechanism 41 operatively connected with the governor 40 as indicated by 42.

The throttle operating lever 17 is pivotally connected at 43 to a yoke 44 integral with a plunger 45 seated within the base of a conical spring retainer 46 having an annular seat 47 for a throttle return spring 48 under compression between the seat 47 and a fixed portion 49 of the vehicle body. Accordingly, clockwise throttle opening movement of lever 17 is resisted by spring 48, which maintains the fluid within the coupling 16 under pressure at all times during operation.

The control mechanism for limiting the top vehicle speed includes an accumulator 50 contained within mating cavities in a two-part housing 51 and 52 suitably clamped together by bolts 53. A flexible diaphragm 54 defines a movable wall of the accumulator 50 and is clamped around its periphery between mating portions of the housing 51, 52. Cup-shaped guides 55 and 56 are secured to opposite sides of diaphragm 54 and are shiftable axially within the mating accumulator cavities of the housing 51, 52. The upper guide 55 comprises a spring retainer for a coil spring 57 under compression between the guide 55 and an upper annular shoulder 58 of the housing 52. A similar shoulder 58a comprises a stop for limiting upward expansion movement of the diaphragm 54. The lower guide 56 is arranged to abut the base of the chamber 50 and limit the downward contraction movement of the diaphragm 54.

The diaphragm 54 extends laterally of the accumulator 50 to define a flexible wall 54a of a fluid-filled valve chamber 59 provided by mating recesses in the housing 51, 52, the peripheral portions of the diaphragm extension 54a around the chamber 59 being clamped between portions of the housing 51, 52. Below the diaphragm extension 54a, a spherical check valve 60 is adapted to seat at an annular valve seat 61 defining the upper end of an inlet bore 62 is housing 51 and communicating with conduit 30 via fluid-filled conduit 63.

A series of ducts 64, 65, 66 and 67 formed within housing 51 connect the valve chamber 59 below diaphragm extension 54a with the interior of the accumulator 50 at the underside of diaphragm 54. An enlargement 68 of the duct 66 provides a fluid return passage in communication with conduit 62, which communication is normally closed by a spherical check valve 72 yieldingly urged against an annular valve seat 69 defining the opening of enlargement 68 into duct 66. The outer end of the duct enlargement 68 is closed by a spherical plug 70 which also comprises a retainer for a coil spring 71 under compression against check valve 72. The entire volume of the accumulator 50 and connected ducts below diaphragm is also filled with incompressible fluid.

A cylindrical bore 73 extending within housing 52 coaxially with duct 62 contains an axially shiftable spool valve 74 having a reduced upper end 75 to provide a seat for annular spring retainer 76. A biasing spring 77 under compression between the retainer 76 and an axially adjustable nut 78 screwed into an upper threaded portion 79 of the housing 52 normally urges the valve 74 downwardly with a force determined by the adjustment of nut 78 and yieldingly seats the lower cylindrical reduced diameter land 80 of valve 74 on the upper surface of the diaphragm extension 54a, thereby to maintain check valve 60 seated to close duct 62 at vehicle speeds less than a predetermined intermediate value, as for example about 50 miles per hour as explained below. The space above diaphragm 54a in communication with the lower end of land 80 is vented by means not shown.

A governor port 81 in communication with the valve bore 73 at a location between the reduced land 80 and a larger diameter governor land 82 is connected with the pressure output of governor 40 by means of duct 81a. Also in communication with bore 73 immediately above land 82 when the valve 74 is at its lowermost position is a work port 83 in communication with the output pressure of pump 39 by means of conduit 83a. Thus at all times the governor pressure is separated from the pump pressure by land 82 and, except at comparatively high vehicle speeds as explained below, the pump output pressure is conducted from port 83 to the exterior of accumulator 50 above diaphragm 54 by ducts 84 and 85 within the housing 52.

In operation of the structure described, upon depression of the customary throttle pedal, lever 10 is pivoted counterclockwise to raise plunger 13 and force a quantity of the fluid from chamber 25 into chambers 27 and 32 via conduits 31 and 63, thereby to move plungers 28 and 20 leftward against the tension of throttle return spring 48 and swing throttle operating lever 17 clockwise in a throttle opening direction, and also to move the transmission modulating plunger 37 upwardly to modulate operation of the transmission in accordance with the position of the throttle and the vehicle speed as is customary.

The hydraulic coupling 16 and the various ducts and chambers in communication therewith contain a fxed amount of incompressible hydraulic fluid, so that a predetermined movement of lever 10 will effect a predetermined opening of the throttle. At vehicle speeds below the aforesaid predetermined intermediate speed, the spool valve 74 will be at its lowermost position whereat the check valve 60 will be seated against seat 61 to close the communication between the accumulator 50 and the hydraulic coupling 16. Likewise, the upper edge 82a of governor land 82 will be at the position indicated in phantom, whereby the output pressure of pump 39 is communicated directly via a portion of bore 73 and ducts 84 and 85 to the upper exterior surface of accumulator 50 to urge diaphragm 54 downwardly to the position shown.

When the vehicle speed exceeds the aforesaid intermediate speed of approximately 50 miles per hour, the pressure at governor port 81, which is a direct function of the vehicle speed, acting on the area differential between lands 80 and 82 will lift valve 74 against the force of spring 77 to enable unseating of check valve 60. However, except to fill the inconsequential increase in the volume of chamber 59, no fluid will flow in conduit 63 at this time because the pump pressure applied to the exterior of the accumulator 50 via port 83 will hold the accumulator 50 in its contracted position shown.

When the vehicle speed approaches a predetermined top limiting speed, which may be 85 or 90 miles per hour by way of example, the governor pressure at port 81 will raise valve 74 toward the position shown to restrict the communication between work port 83 and conduit 84. Upon continued increase in vehicle speed to the desired upper speed limit, land 82 will close work port 83 and shortly thereafter open vent port 87, thereby to vent the external pressure on accumulator 50 and allow expansion of the accumulator volume to receive a portion of the fluid from the hydraulic coupling 16 which will be at a pressure determined by the throttle return spring 48. Plunger 20 will then move rightward and the throttle operating lever 17 will swing counterclockwise in a throttle closing movement to the extent permitted by the amount of fluid that enters accumulator 50, whereupon acceleration of the vehicle is retarded and is stopped entirely at the aforesaid desired upper speed limit regardless that the position of the pedal actuated lever 10 is not changed.

By suitably controlling the leakage flow across the lands 82 and 86 and by predetermining the point of shut off of port 83 and the opening of vent port 87, the modulation of the throttle opening at the desired maximum speed limit may be effected as sharply as desired, so that the maximum vehicle power is obtainable up to within a few miles per hour of the top limiting speed. Thereafter the supply of additional power to the engine is sharply reduced.

In the event that the vehicle speed is reduced from the top limiting speed, as for example by clockwise movement of lever 10, the governor pressure at port 81 will also be reduced, enabling downward movement of valve 74 to close vent port 87 and reopen work port 83, so as to increase the external pressure on the accumulator 50 and urge diaphragm 54 downwardly to contract the accumulator. The fluid from the accumulator 50 is then returned to the coupling 16 via either or both of check valves 60 and 72, depending upon the vehicle speed and the position of valve 74.

I claim:

1. In a vehicle top speed limiter for an automobile engine, the combination of (A) a fuel control throttle for said engine, (B) fluid actuated means for opening said throttle as a function of the volume of fluid supplied to said fluid actuated means, (C) means for supplying a preselected volume of fluid to said fluid actuated means to effect a predetermined opening of said throttle, and (D) means responsive to vehicle speeds in excess of a predetermined top limiting speed for bleeding fluid from said fluid actuated means to decrease the opening of said throttle from said predetermined openings.

2. In the combination according to claim 1, the last-named means comprising (A) an accumulator connected with said fluid actuated means to receive fluid therefrom or to return fluid thereto upon expansion or contraction respectively of said accumulator, and (B) means responsive to the speed of said vehicle for decreasing or increasing the external pressure on said accumulator to expand or contract the same at vehicle speeds greater or less than said top limiting speed respectively.

3. In the combination according to claim 2, said fluid actuated means comprising a fluid receiving chamber having a movable element defining a well thereof and movable in response to the flow of fluid into said chamber, and means operatively connecting said element and throttle, said means for supplying fluid to said fluid actuated means comprising a fluid filled chamber in communication with said fluid receiving chamber and having a second movable element defining a wall of said fluid filled chamber and movable to discharge fluid from the latter chamber to the first named chamber, and personally operated means for moving said second movable element.

4. In the combination according to claim 1, the last named means also comprising means for returning fluid (bled from said fluid actuated means) to said fluid actuated means at vehicle speeds less than said top limiting speed to return said throttle to said predetermined opening.

5. In the combination according to claim 4, (A) said last named means comprising an accumulator connected with said fluid actuated means to receive fluid therefrom or to return fluid thereto upon expansion or contraction respectively of said accumuator, (B) accumulator control means having
  (1) a work port for applying a source of external fluid pressure to said accumulator to contract the latter and
  (2) a vent port for venting said external pressure to enable expansion of said accumulator, (C) pressure actuated valve means operable in one direction for closing said work port and opening said vent port and operable in a second direction for opening said work port and closing said vent port, (D) a source of governor fluid at a pressure comprising a function of said vehicle speed, (E) means for urging operation of said pressure actuated valve means in said one direction with a force comprising a function of the speed of said vehicle including a surface area of said pressure actuated valve means in communication with said source of governor fluid pressure, and (F) means for yieldingly urging operation of said valve means in said second direction to open said work port and close said vent port when the pressure of said governor fluid corresponds to speeds less than said top vehicle speed and being yieldable to enable closing of said work port and opening of said vent port when the pressure of said governor fluid corresponds to said vehicle speed.

6. In the combination according to claim 5, said pressure actuated valve means also including a valve portion for normally closing the connection between said accumulator and fluid actuated means for opening said connection upon operation of said valve means in said one direction in response to predetermined pressure on said surface area.

7. In the combination according to claim 5, said vehicle having a fluid actuated transmission, a fluid pump for supplying pressurized operating fluid for said transmission, a transmission control system including a fluid pressure governor means for supplying transmission control fluid at a pressure comprising a function of the speed of said vehicle, said pump comprising said source of external fluid pressure, and said governor means comprising said source of governor fluid.

8. In a vehicle top speed limiter for an automobile engine having a fuel control throttle, fluid actuated means for opening said throttle as a direct function of the volume of fluid supplied thereto, and means for supplying a preselected volume of fluid to said fluid actuated means to effect a predetermined opening of said throttle, the combination of (A) an accumulator, (B) means for connecting said fluid actuated means with said accumulator to conduct fluid to or from the latter and from or to said fluid actuated means respectively upon expansion or contraction of said accumulator, (C) accumulator control means having
  (1) a work port for applying a source of external fluid pressure to said accumulator to contract the latter and
  (2) a vent port for venting said external pressure from said accumulator to enable expansion thereof, (D) pressure actuated valve means
  (1) operable in one direction to close said work port and open said vent port to enable expansion of said accumulator and
  (2) operable in a second direction to open said work port and close said vent port to contract said accumulator, (E) said pressure actuated valve means having a surface area adapted to be connected with a source of governor fluid at a pressure comprising a function of the speed of said vehicle for operating said valve means in said one direction, and (F) means for yieldingly urging operation of said valve means in said second direction for opening said work port and closing said vent port when said pressure is less than a predetermined value and being yieldable to enable operation of said valve means in said one direction for closing said work port and opening said vent port when said pressure exceeds a predetermined value.

9. In the combination according to claim 8, said pressure actuated valve means also including a valve portion for normally closing the connection between said accumulator and fluid actuated means for opening said connection upon operation of said valve means in said one direction in response to predetermined pressure on said surface area.

References Cited

UNITED STATES PATENTS

| | | | |
|---|---|---|---|
| 2,972,391 | 2/1961 | Faiver et al. | 180—108 |
| 2,976,946 | 3/1961 | Denman et al. | 180—108 |
| 3,065,813 | 11/1962 | Bookout et al. | 180—108 |
| 3,072,210 | 1/1963 | Cramer | 123—103 X |
| 3,081,837 | 3/1963 | Fiteny | 180—108 |
| 3,099,328 | 7/1963 | Berg et al. | 123—103 X |
| 3,194,252 | 7/1965 | Locher et al. | 123—103 X |
| 3,353,620 | 11/1967 | Leslie et al. | 180—108 |
| 3,360,069 | 12/1967 | Chana et al. | 180—108 |

KENNETH H. BETTS, Primary Examiner

U.S. Cl. X.R.

123—103; 137—47